July 9, 1929.
C. W. MALIPHANT
1,720,284
VARIABLE LOAD BRAKE
Filed April 16, 1928
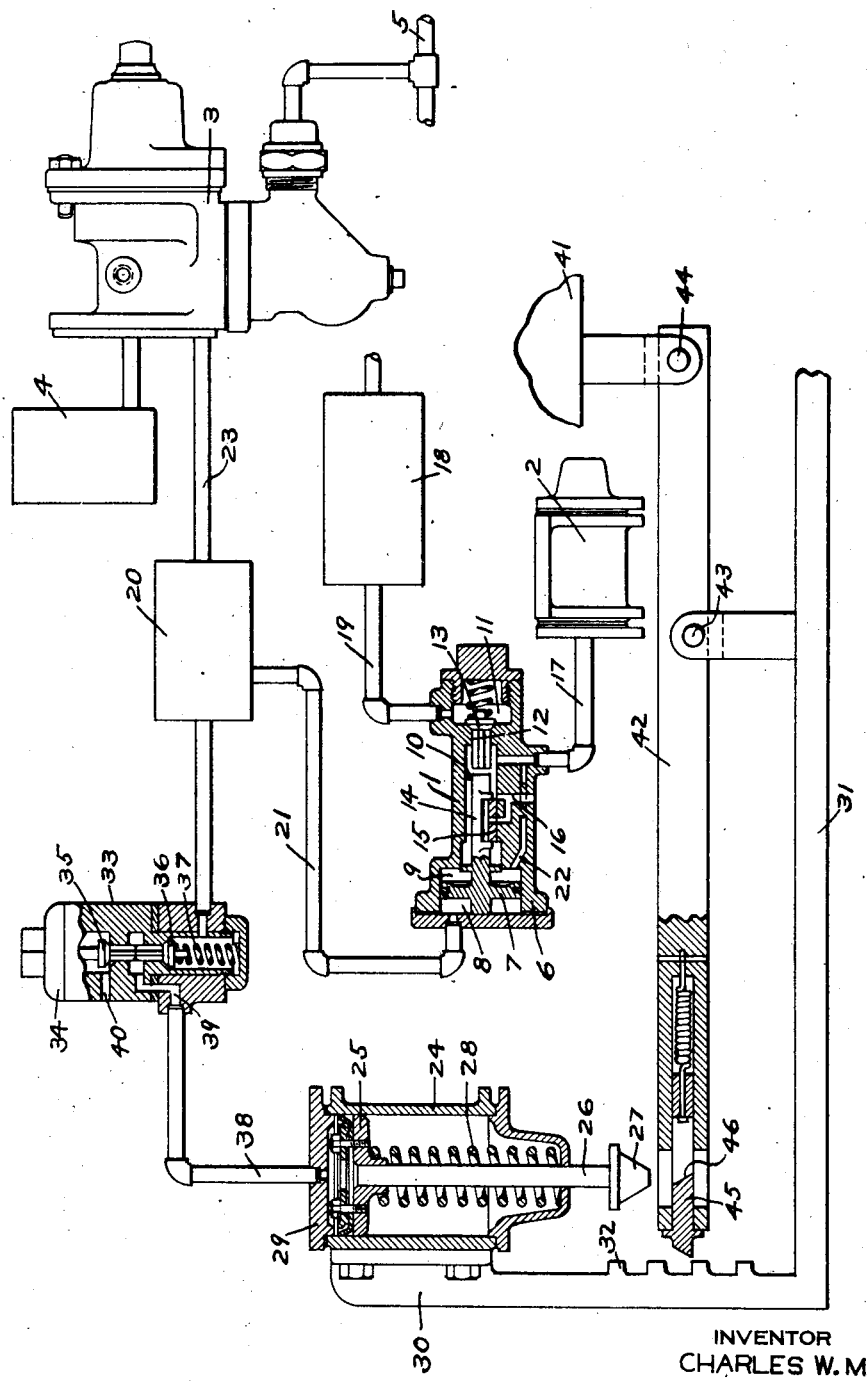
INVENTOR
CHARLES W. MALIPHANT
BY *Wm. M. Cady*
ATTORNEY Patented July 9, 1929.

1,720,284

UNITED STATES PATENT OFFICE.

CHARLES W. MALIPHANT, OF WILMERDING, PENNSYLVANIA, ASSIGNOR TO THE WESTINGHOUSE AIR BRAKE COMPANY, OF WILMERDING, PENNSYLVANIA, A CORPORATION OF PENNSYLVANIA.

VARIABLE-LOAD BRAKE.

Application filed April 16, 1928. Serial No. 270,279.

This invention relates to a variable load fluid pressure brake, in which the braking power is automatically varied according to the load on the car.

An object of the invention is to provide a variable load fluid pressure brake of improved construction, in which maintenance cost will be low, and in which operation of mechanism is not dependent upon the accuracy of extremely small and critical movements.

Another object of my invention is to provide a variable load brake apparatus in which the pressure in the brake cylinder is varied according to the pressure of fluid in a reservoir volume and in which the capacity of the reservoir volume is varied according to the load on the car.

A further object of the invention is the provision of means, of an improved character, for automatically varying the position of a piston in a volume cylinder, and consequently the active operative size of the cylinder, according to the load on the car, the volume cylinder being connected with other mechanism for bringing about proper application and release of the brakes according to the load, when the brake pipe pressure is varied in the usual manner.

A still further object of the invention is to provide, in a variable load brake, a load adjustable lever normally movable at all times with the car body, with means for locking said lever against downward vibration, incident to car travel, upon a brake application, whereby incidental movement of the lever will not change the volume of the variable volume cylinder.

Other objects will appear, as the description proceeds.

In the accompanying drawing, the single figure is a diagrammatic view of a variable load brake apparatus, showing my invention applied thereto.

In carrying out my invention, I employ a brake application valve device 1, which is associated with a car brake apparatus comprising the usual brake cylinder 2, triple valve device 3 and auxiliary reservoir 4, the triple valve 3 being connected to the usual brake pipe 5.

The application valve device 1 may comprise a casing 6 having slidably mounted therein, a piston 7 forming chambers 8 and 9 on the opposite sides thereof. The casing 6 can also be provided with valve chambers 10 and 11 connected by a passage 12, normally closed by a spring seated valve 13. The piston 7 is provided with a piston rod 14 extending into the valve chamber 10, to which is connected a slide valve 15 for controlling the exhaust of fluid through an atmospheric port 16 from brake cylinder 2, which is connected with the valve chamber 10, in any desired way, such as by a pipe 17. The main reservoir 18 is connected with the valve chamber 11 in any desired way, such as by a pipe 19 and the valve 13 is employed for controlling the flow of fluid under pressure from the main reservoir to the valve chamber 10 and consequently into the brake cylinder 2 from the main reservoir 18. This valve 13 is unseated by movement of the piston 7 in one direction. A volume reservoir 20 is connected with the chamber 8 of the casing 6, in any desired way, such as by a pipe 21 and the piston 7 is subject to fluid under pressure in this chamber supplied from the volume reservoir 20 and by fluid under pressure in the chamber 9 to the pressure of fluid in the brake cylinder 2, there being a passage 22 formed in the casing 1 leading from the brake cylinder connection in the casing to the chamber 9.

The volume reservoir 20 is connected to the usual brake cylinder pipe 23 of the usual triple valve device 3, so that upon a reduction in pressure in the usual brake pipe 5, fluid under pressure is supplied from the auxiliary reservoir 4 to the volume reservoir 20 and upon an increase in the brake pipe 5, fluid is vented from the volume reservoir 20 thorugh the usual brake cylinder exhaust port of the triple valve device 3.

Adapted to be connected to the volume reservoir 20 is a variable volume cylinder 24 containing a piston 25, the volume of the cylinder 24 connected to the reservoir 20 being varied according to the position of the piston 25. A piston rod 26 is carried by the piston and extends through the lower end of the cylinder and has connected therewith a tapered head 27, which may be of frusto-conical form, for a purpose which will be later described. An expansion coil spring 28, is placed about the piston rod and normally tends to hold the piston 25 in a raised position against the cylinder head 29.

This cylinder 24 is bolted or otherwise secured to a bracket 30 carried by the spring plank 31 of the car truck or other suitable portion thereof. This bracket is provided with a rack bar 32 for a purpose, which will also be described.

A magnet valve device 33 is provided for controlling the flow of fluid under pressure from the volume reservoir 20 to the cylinder 24 above the piston and the flow of fluid from the cylinder to the atmosphere. The magnet 34 of the magnet valve device 33 is controlled by the opening and closing of the car doors (not shown). Said magnet 34 is adapted to operate double beat valves 35 and 36.

When the car is brought to a stop and the car doors are opened, the magnet will be de-energized, allowing the valve 36 to be seated and the valve 35 unseated under influence of the spring 37. The seating of the valve 36 cuts off communication between the volume reservoir 20 and the variable cylinder 24. The unseating of the valve 35 allows escape of fluid under pressure from the variable volume cylinder 24 to atmosphere through pipe 38, passage 39 and port 40.

Upon the closing of the car doors, the magnet 34 will be energized, causing the seating of the valve 35 and the unseating of the valve 36. This cuts off communication between the volume cylinder 24 and the atmosphere and opens communication between the volume reservoir 20 and the volume cylinder 24. Fluid under pressure will force the piston 25 down, against the tension of its spring 28, for a purpose which will be later described.

Arranged between the car body 41 and the car truck is a load adjustable lever 42, which is fulcrumed intermediate its ends, as at 43, on a suitable portion of the car truck, such as the spring plank 31. One end of the lever is pivotally connected, as at 44, to the car body 41 while the opposite end of the lever 42 is arranged below the volume cylinder 24. By this arrangement, the non-pivoted end of the lever will be moved to different positions relative to the cylinder 24 according to the load on the car. This end of the lever carries a normally spring retracted latch 45, which is adapted to engage the rack bar 32, when the latch is forced outward against its spring. Upon the lowering of the piston 25 by fluid under pressure, the head 27 of the piston rod 26 acts against a beveled face 46 of the latch 45, causing the outward movement thereof against the tension of the latch spring.

Assuming a car is stopped, the car doors open, and the brakes released, preparatory to restarting the car, the various parts of the device will be positioned, as shown in the drawing. In this position, the volume cylinder 24 is vented to the atmosphere, through connecting pipe 38, passage 39 and port 40, which will allow the raising of the piston 25 and the consequent moving of the head 27 away from the lever 42. Any change in the car load will move the outer end of the lever 42 toward or away from the variable volume cylinder 24, according to whether the load is increased or decreased. Upon the closing of the car doors, the magnet 34 of the magnet valve device 33 will be energized, causing the seating of the valve 35 and the unseating of the valve 36. This movement of the valves will cut off atmospheric communication of the variable volume cylinder 24 and establish communication between the volume cylinder and the volume reservoir 20, as stated.

When it is desired to stop the car, a reduction in pressure is made in the brake pipe 5 in the ordinary way, which will allow the flow of fluid under pressure, through the medium of the triple valve 3, from the auxiliary reservoir 4 into the volume reservoir 20 and variable volume cylinder 24 (the valve 36 of the magnet valve device 33 being open) and into the application valve device 1. Fluid under pressure, entering the volume cylinder 24, acts upon the piston 25 and forces the same down until the head 27 of the piston rod 26 strikes the beveled face 46 of the latch 45, at which time the latch is moved outward by said head into engagement with the adjacent tooth of the rack bar 32. Thus further downward movement of the piston 25 is prevented, holding the volume of the variable cylinder 24 constant, due to the locking of the lever 42 with the rack bar. This also prevents movement of the lever, due to vibration of the car body, in one direction. It therefore can be seen that the active operative capacity of the volume cylinder 24 is controlled by the position of the outer end of the lever 42. The fluid under pressure flowing into the chamber 8 of the application valve device 1 acts upon the piston 7, first causing movement of valve 15 to cut off connection from the brake cylinder 2 to the exhaust port 16 and then operating to unseat valve 13. The unseating of the valve 13 allows the flow of fluid under pressure from the main reservoir 18 into the brake cylinder 2 and the consequent applying of the brakes. It being noted that the fluid under pressure from the main reservoir 18 flows into piston chamber 9 (by virtue of passage 22) and acts upon piston 7 and against fluid under pressure in the chamber 8 (volume pressure), and that any change in these pressures will cause the seating or unseating of the valve 13, as the case might be. The pressure of brake application will thus be the same as the pressure on the application piston 7 from the volume reservoir 20. When the pressure of fluid in the brake cylinder 2 and acting upon the inner face of the piston 7 in chamber 9 has been increased to a degree slightly in excess of the pressure of fluid supplied from the volume reservoir and acting on the outer face of the piston in chamber 8, the piston will be moved sufficiently to permit the valve 13 to seat, but not sufficiently to permit the valve 15 to open the atmospheric port 16. As the pressure on the piston 7 supplied from the volume reservoir depends on the active operative size of the variable volume cylinder 24, brake cylinder pressure obtained in applying the brakes will be proportional to the loaded weight of the car. It being seen that upon release of the brakes, the volume reservoir and the fluid under pressure on the outer side of the piston 7 of the application valve device 1, is vented to the atmosphere, through the triple valve 3, causing fluid under pressure in the brake cylinder 2 to move the piston to its extreme outward position, which moves the slide valve 15 away from exhaust port 16, allowing the fluid under pressure to be exhausted from the brake cylinder 2, thus releasing the brakes.

Upon the opening of a car door, the magnet 34 of the magnet valve device 33, is deenergized, as stated, which vents the volume cylinder 20 to the atmosphere, allowing upward movement of the piston 25 thereof and the consequent re-positioning of the lever 42 according to change in the load.

The term reservoir volume used in certain of the claims embraces the volume cylinder 25, volume reservoir 20 and associate ports.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. In a variable load brake, the combination with a brake cylinder, of a chamber into which fluid under pressure is supplied in applying the brakes, means operated according to pressure in said chamber for controlling the supply of fluid under pressure to the brake cylinder, and means for governing the pressure in said chamber including a volume reservoir, a volume cylinder and means for varying the volume of said cylinder according to the load on the car.

2. In a variable load brake, the combination with a brake cylinder and a main reservoir, of a chamber into which fluid under pressure from the main reservoir is supplied in applying the brakes, means operated according to pressure for controlling the supply of fluid under pressure from the main reservoir to the brake cylinder, and means for governing the pressure including a volume reservoir, a volume cylinder and means for varying the volume of said volume cylinder according to the load on the car.

3. In a variable load brake, the combination with a brake cylinder and a main reservoir, of means operated according to pressure for controlling the supply of fluid under pressure from the main reservoir to the brake cylinder, and means for governing the pressure including a volume cylinder, means for supplying fluid under pressure to the volume cylinder upon a brake application, and means for varying the volume of said volume cylinder according to the load on the car.

4. In a variable load brake, the combination with a brake cylinder, of a chamber into which fluid under pressure is supplied in applying the brakes, means operated according to pressure in said chamber for controlling the supply of fluid under pressure to the brake cylinder, and means for governing the pressure in said chamber including a volume reservoir, a volume cylinder, means for varying the volume of said volume cylinder according to the load on the car, an auxiliary reservoir, and means for supplying fluid under pressure from the auxiliary reservoir to the volume cylinder and volume reservoir upon a brake application.

5. In a variable load brake, the combination with a brake cylinder, of a chamber into which fluid under pressure is supplied in applying the brakes, means operated according to pressure in said chamber for controlling the supply of fluid under pressure to the brake cylinder, and means for governing the pressure in said chamber including a volume reservoir, a volume cylinder, means for varying the volume of said volume cylinder according to the load on the car, and a valve device operated upon a reduction of pressure in the chamber caused by reduction in pressure in the volume cylinder and volume reservoir for releasing fluid under pressure from the brake cylinder.

6. In a variable load fluid pressure brake, the combination with a brake cylinder and a main reservoir, of an application valve device operated by pressure for controlling the flow of fluid under pressure from the main reservoir to the brake cylinder and the venting of fluid under pressure from the brake cylinder, means for controlling the pressure in said application valve device including a volume reservoir and a volume cylinder, a triple valve device for controlling the flow of fluid under pressure and the venting of fluid under pressure from the volume reservoir and cylinder upon variation in pressure in the brake pipe, and means for varying the volume of said volume cylinder according to the load on the car including a piston in said cylinder and a load movable lever normally movable by the car body for engaging said piston.

7. In a variable load fluid pressure brake, the combination with a brake cylinder and a main reservoir, of an application valve device operated by pressure for controlling the flow of fluid under pressure from the main reservoir to the brake cylinder and the venting of fluid under pressure from the brake cylinder, means for controlling the pressure in said application valve device including a volume reservoir and a volume cylinder, a triple valve device for controlling the flow of fluid under pressure and the venting of fluid under pressure from the volume reservoir and cylinder upon variation in pressure in the brake pipe, and means for varying the volume of said volume cylinder according to the load on the car including a piston in said cylinder and a load movable lever normally movable by the car body for engaging said piston and means for locking the lever against movement in one direction by said piston upon admittance of fluid under pressure to the volume cylinder.

8. In a variable load fluid pressure brake, the combination with a brake cylinder and a main reservoir, of an application valve device operated by pressure for controlling the flow of fluid under pressure from the main reservoir to the brake cylinder and the venting of fluid under pressure from the brake cylinder, means for controlling the pressure in said application valve device including a volume reservoir and a volume cylinder, a triple valve device for controlling the flow of fluid under pressure and the venting of fluid under pressure from the volume reservoir and cylinder upon variation in pressure in the brake pipe, and means for varying the volume of said volume cylinder according to the load on the car including a piston in said cylinder and a load movable lever fulcrumed intermediate its ends to a car truck and pivoted at one end to a car body, a rack bar immovable relative to the lever and volume cylinder, a normally retracted latch carried by the free end of the lever, and means for moving the latch in engagement with the rack bar by said piston upon admittance of fluid under pressure to the volume cylinder.

9. In a variable load fluid pressure brake, the combination with a brake cylinder and a main reservoir, of an application valve device operated by pressure for controlling the flow of fluid under pressure from the main reservoir to the brake cylinder and the venting of fluid under pressure from the brake cylinder, means for controlling the pressure in said application valve device including a volume reservoir and a volume cylinder, a triple valve device for controlling the flow of fluid under pressure and the venting of fluid under pressure from the volume reservoir and cylinder upon variation in pressure in the brake pipe, means for varying the volume of said volume cylinder according to the load on the car including a piston in said cylinder and a load movable lever fulcrumed intermediate its ends to a car truck and pivoted at one end to a car body, a rack bar immovable relative to the lever and volume cylinder, a normally retracted latch having a beveled face carried by the free end of the lever, a piston rod carried by the piston and extending exteriorly of the lower end of the volume cylinder, a tapered head on the lower end of the piston rod for engaging the beveled face and moving the latch in engagement with the rack bar upon admittance of fluid under pressure to the volume cylinder, and spring means normally holding the piston in a raised position and the tapered head out of the path of the free end of the lever.

10. In a variable load fluid pressure brake, the combination with a brake cylinder and a main reservoir, of an application valve device operated by pressure for controlling the flow of fluid under pressure from the main reservoir to the brake cylinder and the venting of fluid under pressure from the brake cylinder, means for controlling the pressure in said application valve device including a volume reservoir and a volume cylinder, a triple valve device for controlling the flow of fluid under pressure and the venting of fluid under pressure from the volume reservoir and cylinder upon variation in pressure in the brake pipe, means for varying the volume of said volume cylinder according to the load on the car including a piston in said cylinder and a load movable lever normally movable by the car body for engaging said piston, and means controlled by the opening and closing of a car door for equalizing pressure in the volume cylinder and volume reservoir and for venting fluid from the volume cylinder.

11. In a variable load fluid pressure brake, the combination with a brake cylinder and a main reservoir, of an application valve device operated by pressure for controlling the flow of fluid under pressure from the main reservoir to the brake cylinder and the venting of fluid under pressure from the brake cylinder, means for controlling the pressure in said application valve device including a volume reservoir and a volume cylinder, a triple valve device for controlling the flow of fluid under pressure and the venting of fluid under pressure from the volume reservoir and cylinder upon variation in pressure in the brake pipe, means for varying the volume of said volume cylinder according to the load on the car including a piston in said cylinder and a load movable lever normally movable by the car body for engaging said piston, and means controlled by the opening and closing of a car door for venting fluid under pressure from the volume cylinder when the car door is open and for establishing communication between the volume cylinder and volume reservoir when the door is closed.

12. In a variable load brake, the combination with a brake cylinder, of means for supplying fluid under pressure to the brake cylinder in proportion to the pressure of fluid in a reservoir volume, and means for varying the size of said volume in proportion to the load on the car.

13. In a variable load brake, the combination with a brake cylinder, of means for supplying fluid under pressure to a reservoir volume, means for supplying fluid under pressure to the brake cylinder at a pressure proportional to the pressure of fluid in said volume, and means for varying said volume in proportion to the load on the car.

14. In a variable load brake, the combination with a brake pipe and brake cylinder, of a valve device operated upon a reduction in brake pipe pressure for supplying fluid under pressure to a reservoir volume, means for supplying fluid under pressure to the brake cylinder in proportion to the pressure of fluid in said volume, and means for varying the capacity of said volume in proportion to the load on the vehicle.

15. In a variable load brake, the combination with a brake pipe and brake cylinder, of a valve device operated upon a reduction in brake pipe pressure for supplying fluid under pressure to a reservoir volume, means for supplying fluid under pressure to the brake cylinder in proportion to the pressure of fluid in said volume, and means for varying the capacity of said volume in proportion to the load on the vehicle including a piston and cylinder in said reservoir volume, a load adjustable member for controlling the position of said piston in said cylinder.

16. In a variable load brake, the combination with a brake pipe and brake cylinder, of a connected volume cylinder and volume reservoir, a valve operated upon a reduction in brake pipe pressure for supplying fluid under pressure to the volume reservoir and volume cylinder, means for supplying fluid under pressure to the brake cylinder in proportion to the pressure of fluid in said volume reservoir and volume cylinder, a piston in said cylinder, and a load adjustable lever for controlling the position of the piston in the cylinder for varying the pressure of fluid in said cylinder and reservoir in proportion to the load on the vehicle.

17. In a variable load brake, the combination with a brake pipe and brake cylinder, of a connected volume cylinder and volume reservoir, a valve operated upon a reduction in brake pipe pressure for supplying fluid under pressure to the volume reservoir and volume cylinder, means for supplying fluid under pressure to the brake cylinder in proportion to the pressure of fluid in said volume reservoir and volume cylinder, a piston in said cylinder, a load adjustable lever for controlling the position of the piston in the cylinder for varying the pressure of fluid in said cylinder and reservoir in proportion to the load on the vehicle, and valve means interposed between the volume cylinder and volume reservoir controlled by the opening and closing of a vehicle door for venting fluid under pressure from the volume cylinder when the vehicle door is open and for establishing communication between the volume cylinder and volume reservoir when the door is closed.

In testimony whereof I have hereunto set my hand.

CHARLES W. MALIPHANT.